May 26, 1964
L. M. FRANK ETAL
3,134,117
VEHICLE WASHER
Filed Feb. 23, 1962
10 Sheets-Sheet 1
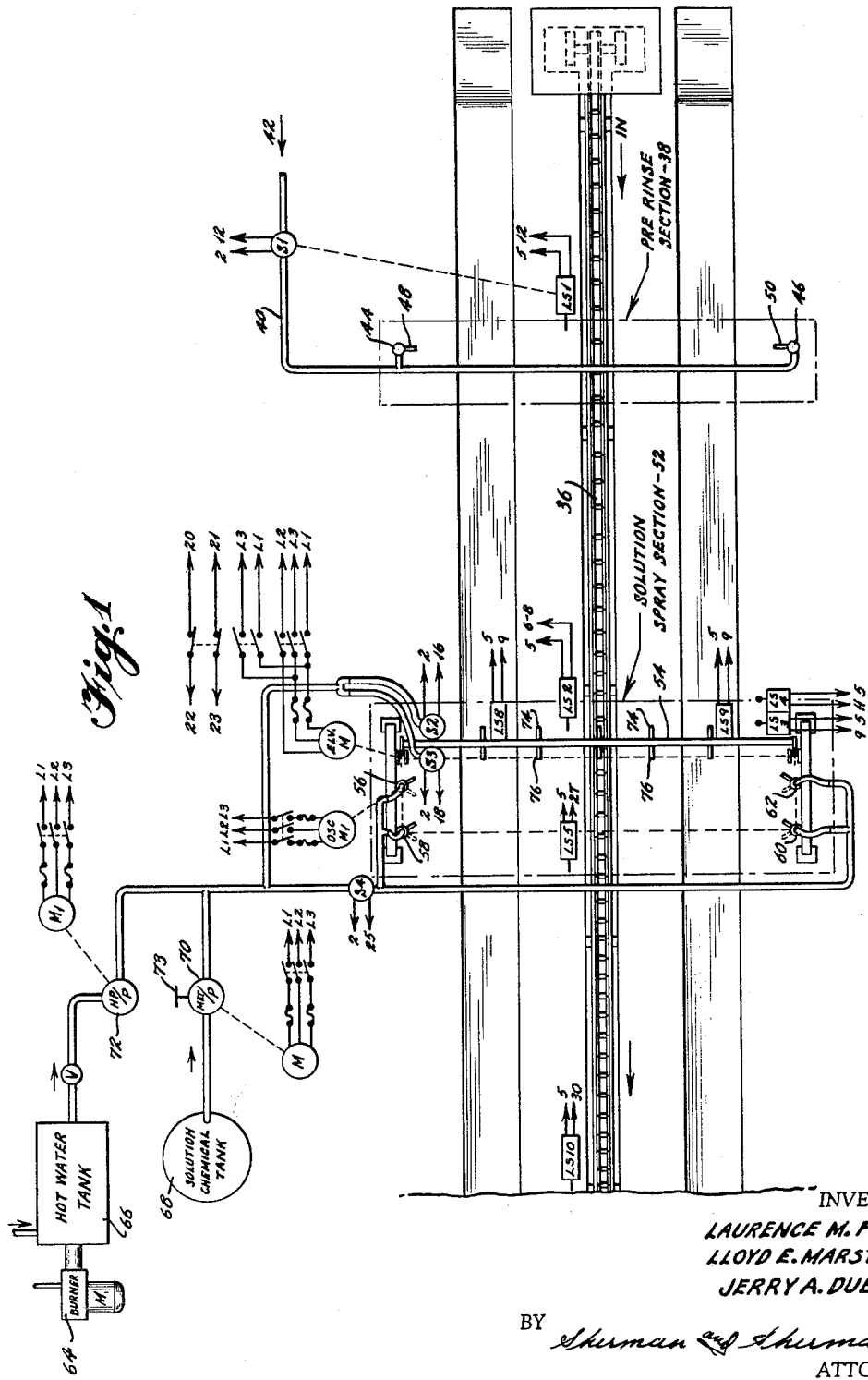
INVENTORS
LAURENCE M. FRANK,
LLOYD E. MARSTON and
JERRY A. DUBROF
BY Sherman and Sherman
ATTORNEYS

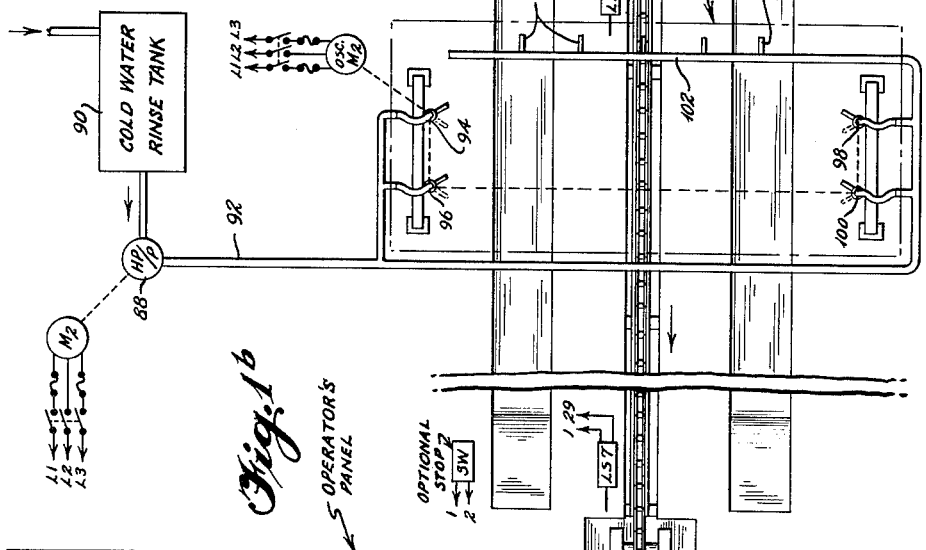
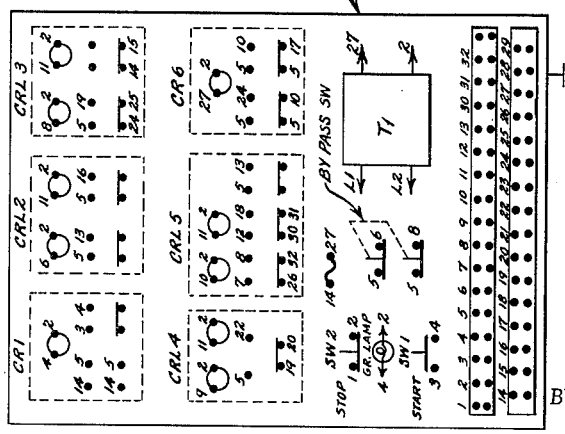

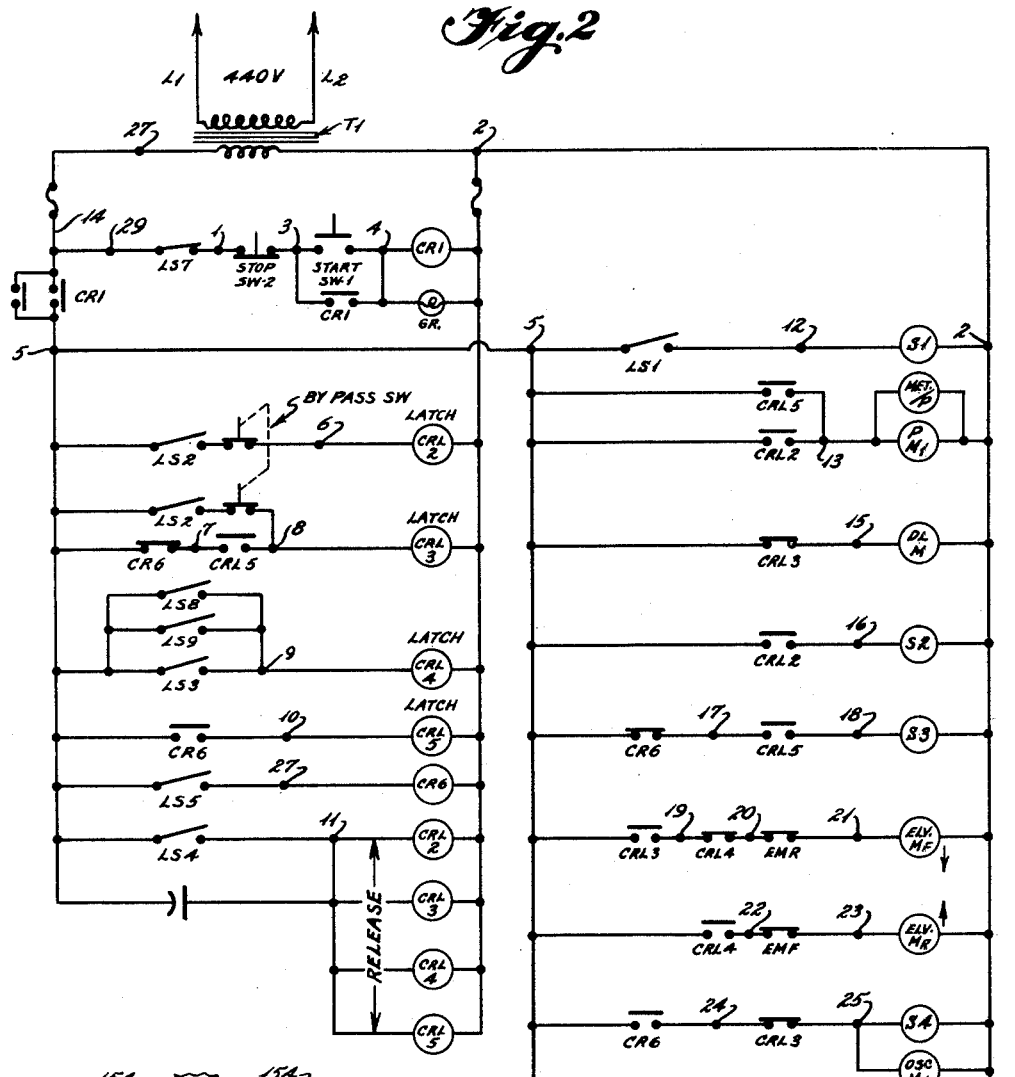

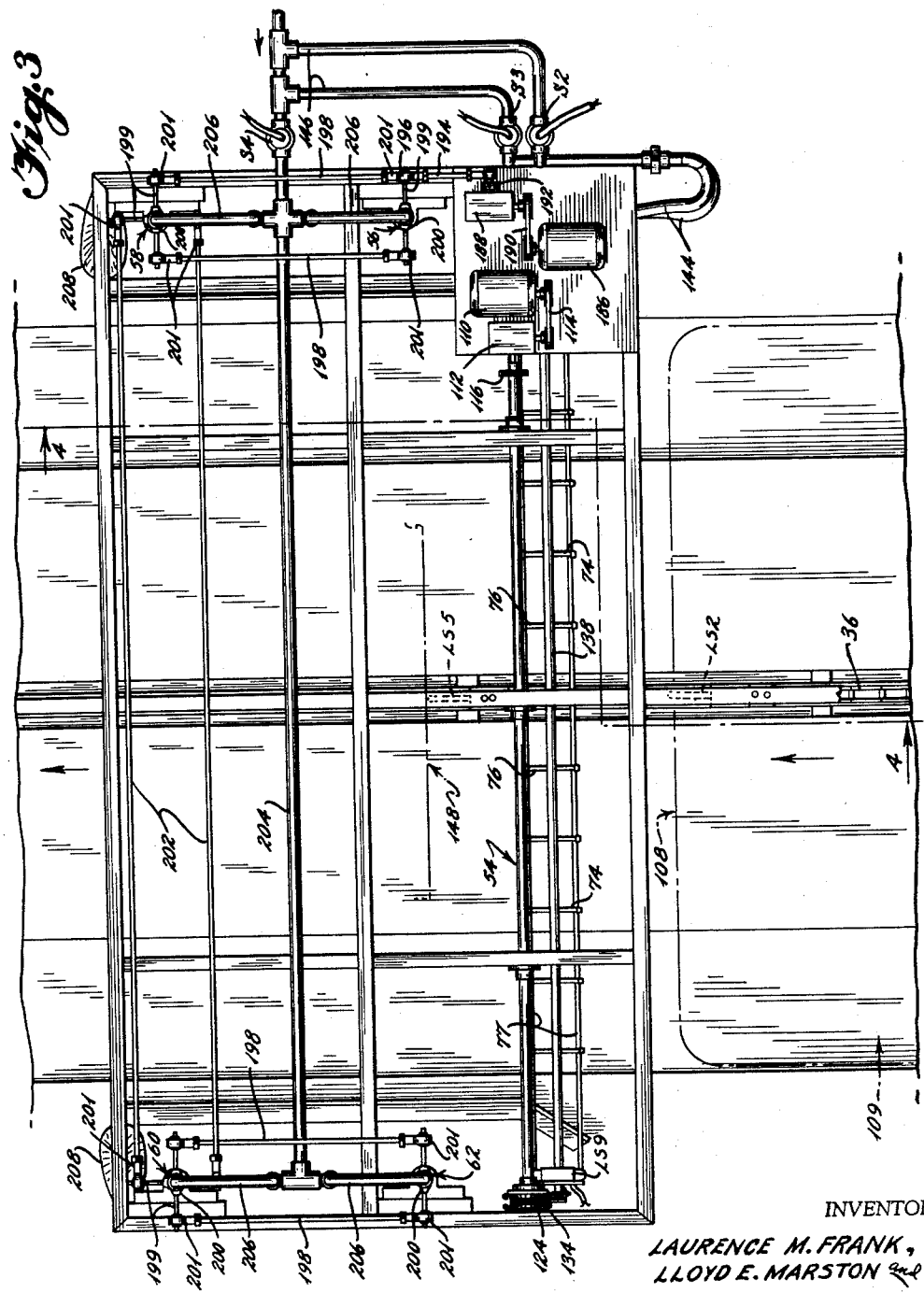

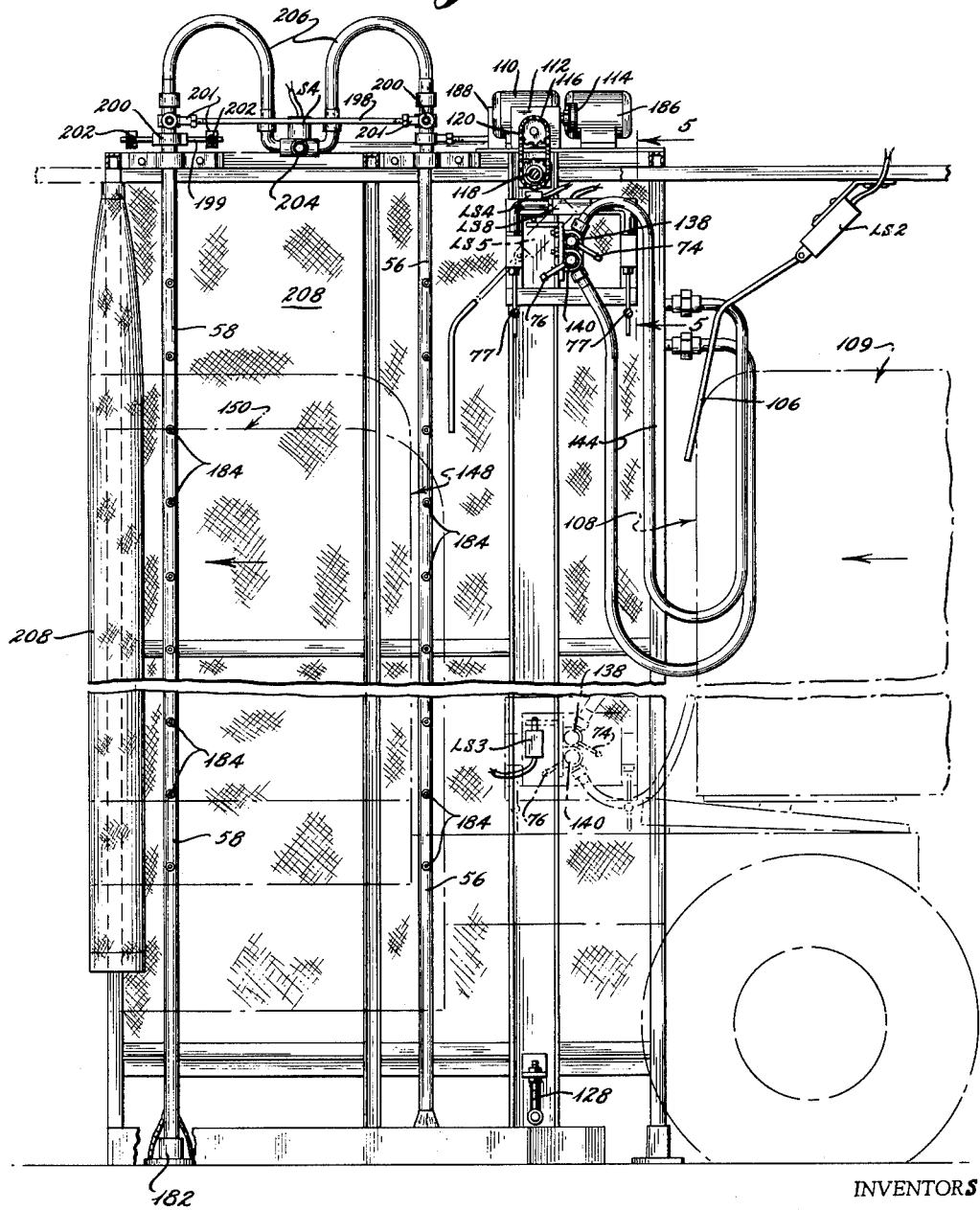

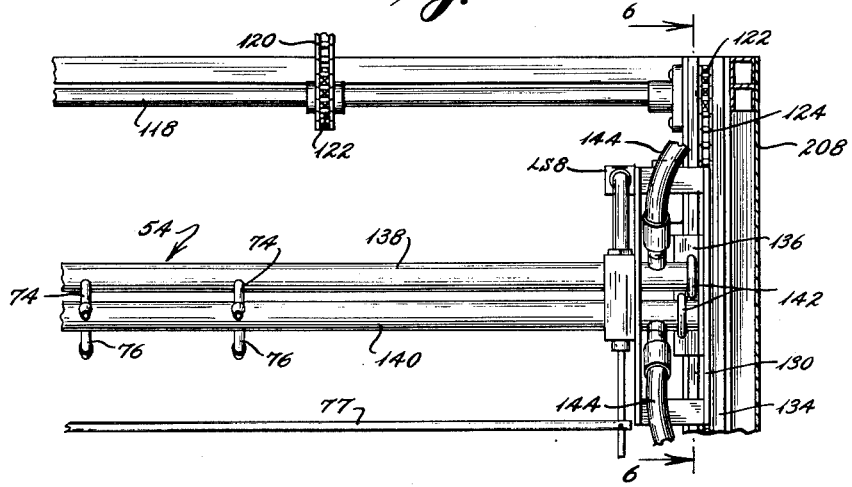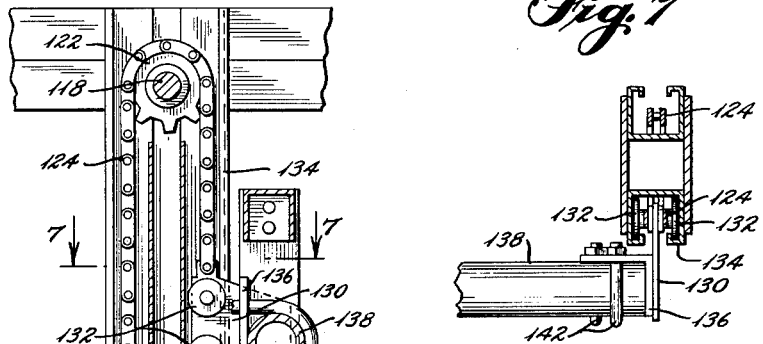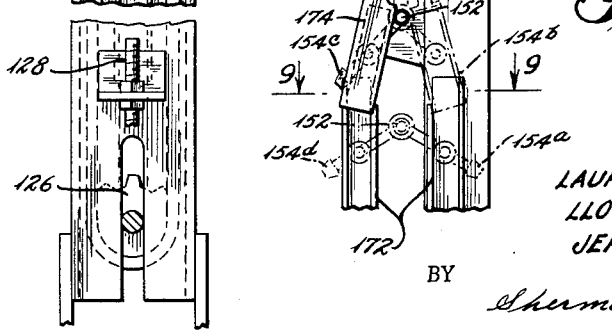

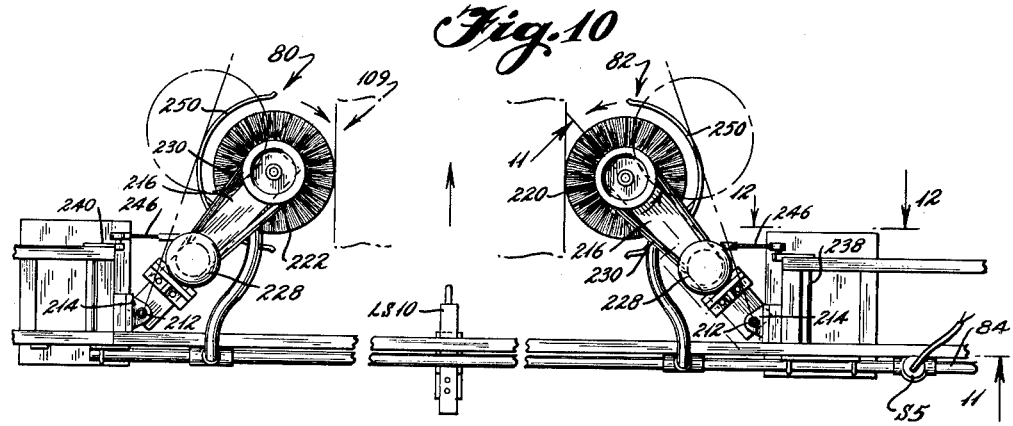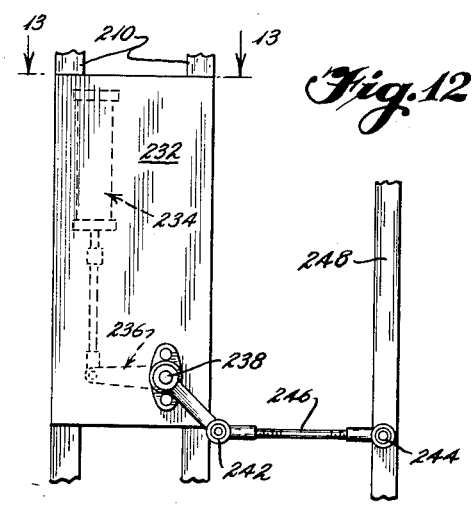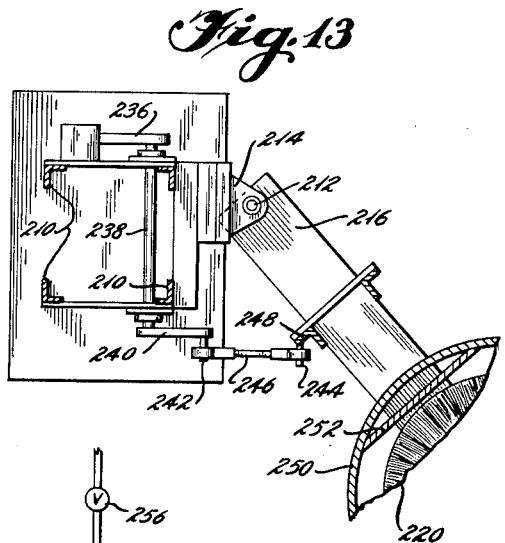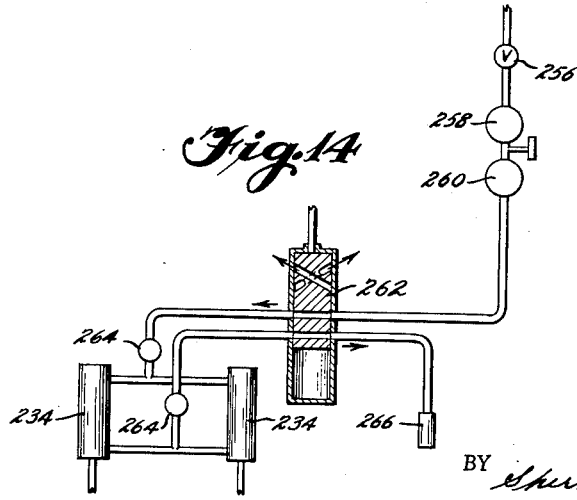

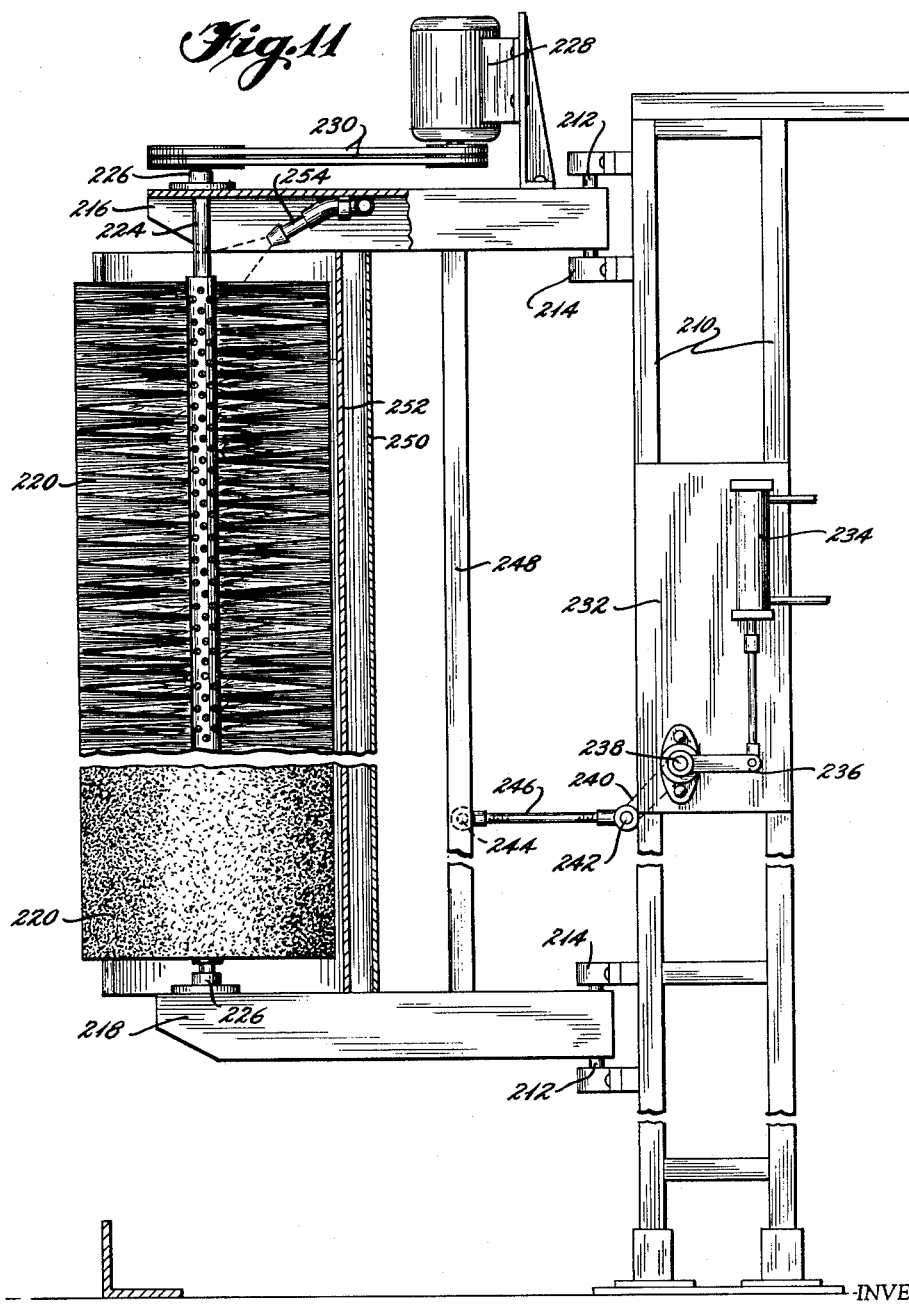

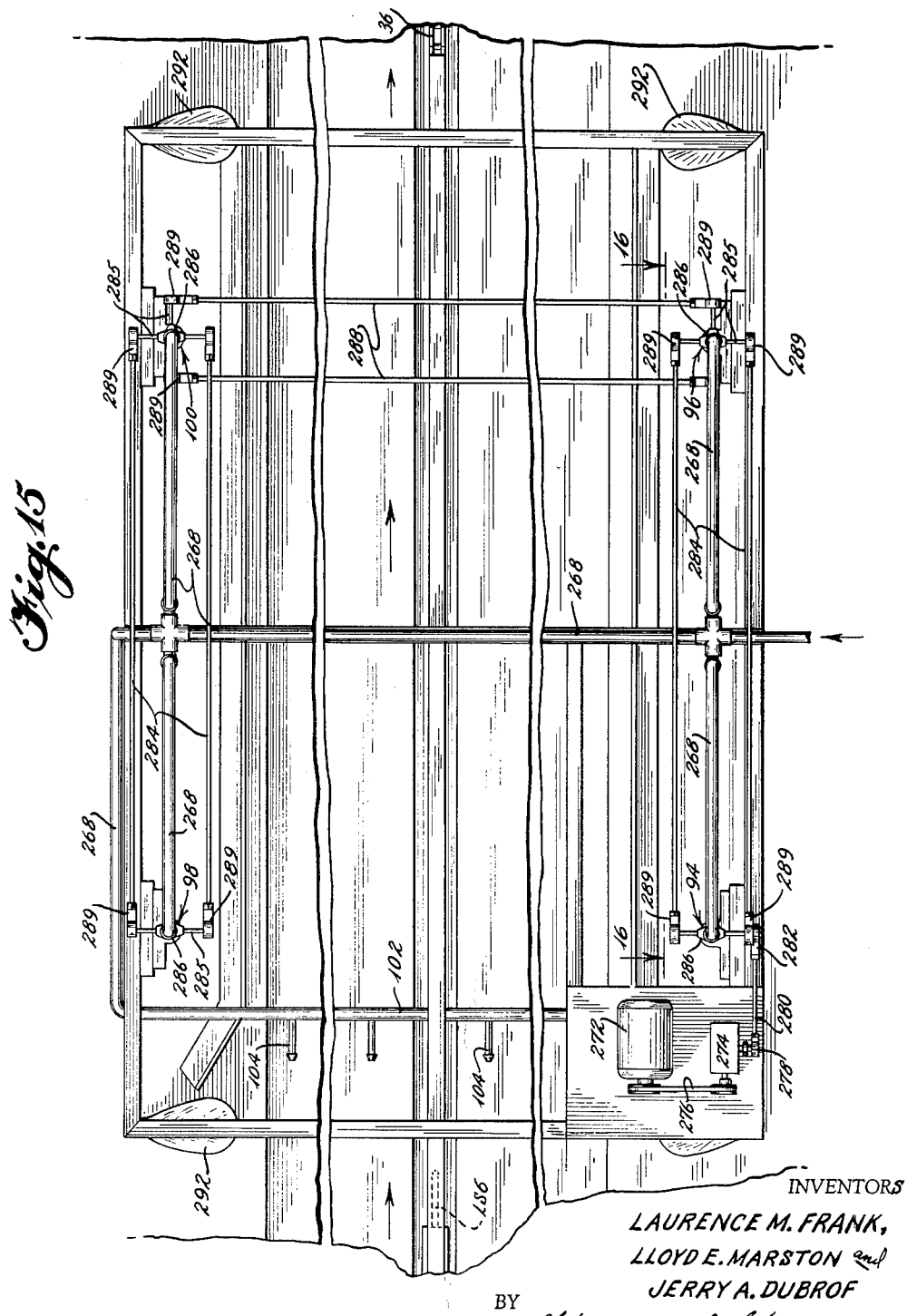

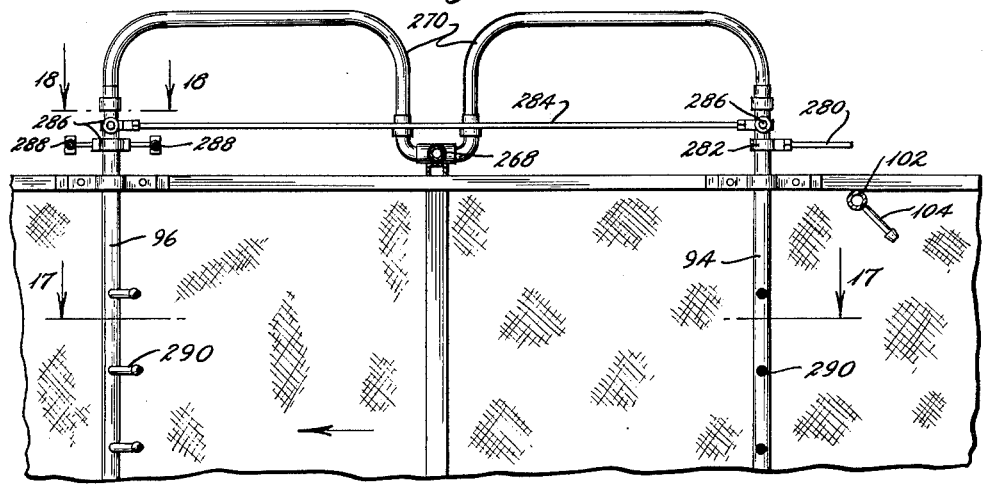
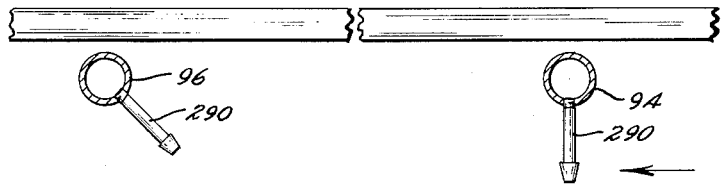
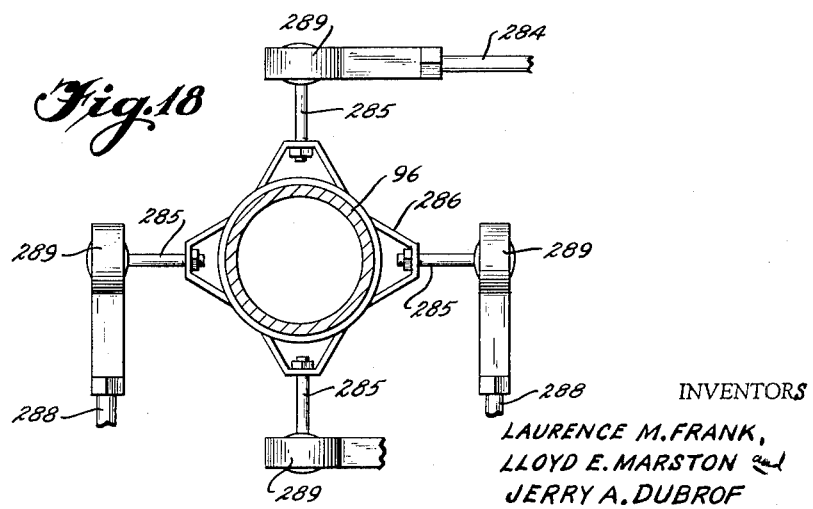
INVENTORS
LAURENCE M. FRANK,
LLOYD E. MARSTON and
JERRY A. DUBROF
BY Sherman and Sherman
ATTORNEYS United States Patent Office 3,134,117
Patented May 26, 1964

3,134,117
VEHICLE WASHER
Laurence M. Frank, Lloyd E. Marston, and Jerry A. Dubrof, Atlanta, Ga., assignors to Olympic Manufacturing Company, Atlanta, Ga., a corporation of Georgia
Filed Feb. 23, 1962, Ser. No. 174,936
29 Claims. (Cl. 15—21)

This invention relates to vehicle washing equipment and relates more particularly to a device which is especially suited for the washing of large commercial vehicles, such as trailers, vans, and the like. More specifically, the instant invention relates to a vehicle washing apparatus provided with novel spraying mechanisms for applying solutions to the surfaces of a vehicle.

Many devices are known for the washing of motor vehicles in a continuous or semi-continuous manner. The original commercial car washers were designed to wash a single car in a stationary position by surrounding the same with a horseshoe-type manifold which sprayed rinse water or cleaning solution, or both, over the car surface. It was then necessary for an attendant to hand-scrub the vehicle to remove the dirt and grime accumulated during road use. Such structures, although an improvement over complete hand-washing, were obviously still quite inefficient from the commercial standpoint.

Later developments maintained the spraying devices stationary and sequentially moved a plurality of vehicles past the sprays to effectuate semi-continuous cleaning. However, attendants were still required for hand-scrubbing the wet, or soaped, vehicle to loosen and remove caked-on road grime. Eventually, numerous brush devices were developed to replace the hand-scrubbing and thereby facilitate the cleaning operation. Unfortunately, such equipment became extremely complex and expensive to manufacture and maintain. Furthermore, these prior art devices were commercially inefficient from numerous other viewpoints. For example, while such devices were extremely expeditious when compared to a manual operation, they continued to suffer from being relatively slow and therefore uneconomical in a commercial sense. Also, the cleaning action was known to be poor when compared to hand-washing, but this was grudgingly accepted because of the public desire for automatic vehicle washing apparatus. In addition to the low standard of cleaning of prior art devices, they were also expensive to install and operate. Their complexity required a high initial outlay and rendered them subject to frequent mechanical breakdowns, causing additional expense for repairs and loss of productive time. Moreover, vehicle washing devices used heretofore were extremely inefficient in their use of various utilities, such as electricity and water, and were quite wasteful in the application of cleaning solutions, such as detergents and the like.

At the present time, problems are experienced in the cleaning of large commercial vehicles, particularly compound vehicles, that is, vehicles having a trailer portion attached to and driven by a tractor, cab, or the like. These vehicles are continuously used under high-speed highway conditions and in various kinds of weather. Thus, the surfaces of these large commercial vehicles become rapidly encrusted with road dirt and grime, and require frequent cleaning. Furthermore, under current Interstate Commerce Commission regulations, it is necessary to wash commercial vehicles after specified intervals of road travel. The massive size of such vehicles and the heavy accumulation of dirt makes the washing operation difficult and expensive. Particularly difficult to clean adequately by prior art structures is the front of a trailer or the like, because of its proximity to the tractor portion of the compound vehicle. The front and rear doors are also quite difficult to clean by prior art structures and are subject to becoming exceedingly dirty because of their particular relationship to the vehicle. The rear doors, due to the suction and vacuum created by high speeds, become the dirtiest portion of the trailer.

Accordingly, an object of this invention is to provide a vehicle washing apparatus free from the foregoing and other disadvantages.

A further object of the instant invention is to provide a washing apparatus especially suited for large commercial vehicles.

Another object of this invention is the provision of a fully automated, fast and efficient vehicle washing apparatus which is of relatively simplified design and construction.

Still another object of the instant invention is the provision of novel spraying mechanisms for applying solutions to the surfaces of the vehicle.

Another object of this invention is to provide an improved washing apparatus capable of efficiently cleaning normally inaccessible portions of a compound vehicle.

Other objects and advantages of this invention, together with certain details of construction and combinations of parts, will appear from the following detailed description and will be particularly pointed out in the appended claims.

In the drawings, wherein preferred embodiments of this invention are shown,

FIGURES 1 and 1a, taken together, are a schematic plan view of the vehicle washing apparatus layout of the instant invention;

FIGURE 1b is a schematic diagram of the operator's panel which controls the actuation, interruption and cessation of the operation of the vehicle washing apparatus;

FIGURE 2 is a schematic view of the electrical circuit for the instant invention;

FIGURE 3 is an enlarged top view of the solution spray section, showing the front and rear solution spray boom and the side solution spray oscillating manifolds;

FIGURE 4 is a cross-sectional view on line 4—4 in FIGURE 3, in the direction of the arrows;

FIGURE 5 is an enlarged detail, partly in section on line 5—5 in FIGURE 4, in the direction of the arrows;

FIGURE 6 is a cross-sectional view on line 6—6 in FIGURE 5, in the direction of the arrows;

FIGURE 7 is a cross-sectional view on line 7—7 in FIGURE 6, in the direction of the arrows;

FIGURE 8 is an end view of part of a further embodiment of a front and rear solution spray boom;

FIGURE 9 is a cross-sectional view on line 9—9 in FIGURE 8, in the direction of the arrows;

FIGURE 10 is an enlarged top view of the brush section with parts broken away;

FIGURE 11 is a vertical elevation with parts in section taken on line 11—11 in FIGURE 10, in the direction of the arrows;

FIGURE 12 is a cross-sectional view on line 12—12 in FIGURE 10, in the direction of the arrows;

FIGURE 13 is a cross-sectional view on line 13—13 in FIGURE 12, in the direction of the arrows;

FIGURE 14 is a schematic showing of the pneumatic layout for operating the brush section;

FIGURE 15 is an enlarged top view of the final rinse section, showing the overhead rinse manifold and the final rinse oscillating manifolds;

FIGURE 16 is a fragmentary cross-sectional view on line 16—16 in FIGURE 15 in the direction of the arrows;

FIGURE 17 is a fragmentary cross-sectional view on line 17—17 in FIGURE 16 in the direction of the arrows.

FIGURE 18 is an enlarged cross-sectional view on line 18—18 in FIGURE 16.

Like reference numerals indicate like parts throughout the several views of the drawings.

Referring now to the drawings for a detailed description of the overall system of the instant invention, and particularly to FIGURES 1, 1a, 1b, and 2, the vehicle to be washed, which for the purposes of this description will be designated a trailer connected to and driven by a tractor, is moved to the entrance of the vehicle washing apparatus, located on the far right of FIGURE 1. (The trailer is not shown in FIGURES 1 or 1a for simplification.) The cab is attached to drag line conveyor chain 36 by a hook or any other conventional means. The operator of the vehicle washing apparatus described herein is usually located in a room where he has visual access to at least a substantial portion of the overall structure. When he sees that a vehicle is in position to be washed, he pushes a starter button, designated SW1, on the operator's panel, which energizes circuit relay 1 (CR1). The circuit relay CR1 contacts close, thus starting the drag line conveyor motor (DLM) and lighting the green lamp (GR. LAMP) on the operator's panel. This indicates to the operator that the power is on. The trailer then starts through the system being pulled by the drag line conveyor chain 36. It has been found advantageous to operate the drag line at about 15 feet per minute, but the speed obviously depends on the particular application of the washing apparatus. As the front of the trailer approaches the pre-rinse section 38, it trips limit switch 1 (LS1) which opens solenoid valve 1 (S1), thus allowing water from the tap to enter a feed pipe 40 in the direction indicated by arrow 42. The water flows through the feed pipe 40 to pre-rinse manifolds generally designated as 44 and 46. Preferably, the pre-rinse manifolds 44 and 46 are stationary, vertically extending manifolds, each being provided with a plurality of vertically spaced spray nozzles, indicated schematically by reference numerals 48 and 50. The pre-rinse water is continuously sprayed on the trailer while limit switch LS1 is in its actuated position. In accordance with this invention, when the trailer passes the limit switch LS1, the pre-rinse spray is automatically stopped by the closing of the solenoid valve S1. The trailer continues its movement through the system until it contacts limit switch 2 (LS2) positioned ahead of a solution spray section 52. This section comprises the novel front and rear solution spray boom 54 of the instant invention and a plurality of novel side solution spray oscillating manifolds 56, 58, 60 and 62.

In contrast to vehicle washing devices known heretofore, the novel apparatus of the instant invention provides for automatically dispensing cleaning solution onto the vehicle through the front and rear solution spray boom 54 and the aforementioned oscillating manifolds. Many car washing structures have required hand application of cleaning solutions, which obviously requires additional labor and thus would be impractical, if not impossible, with such massive vehicles as commercial trailer trucks. Also, automatic application has been known in the past, but it has been conventional to provide a mixing chamber wherein the hot and cold water and the concentrated cleaning solution were combined, and from which the diluted cleaning solution was pumped to a spray means for application to the vehicle surface. As the solution level dropped in the mixing chamber, additional ingredients were added. However, such structures were deficient in that they required additional apparatus and the mixed cleaning solution sitting in the mixing chamber had a tendency to become cool between successive vehicles. The instant invention overcomes these disadvantages by providing a burner 64 which constantly heats water stored in a hot water tank 66 to a desired temperature. The cleaning solution is stored in a solution chemical tank 68, in concentrated form, and when a trailer actuates the limit switch LS2, circuit relay latches 2 and 3 (CRL2 and CRL3) are closed. This opens solenoid valve 2 (S2) leading to the front manifold on the solution spray boom 54. These circuit relay latches also function to turn on metering pump 70 (MET P) and the high pressure pump 72 (HPP). The concentration of the cleaning solution can be varied through the control valve 73 on the metering pump 70, by varying the piston stroke on the metering pump 70 or by any other conventional means. The concentrated cleaning solution is thereby automatically metered and mixed with the hot water immediately before being fed to the front solution spray boom at high pressure. It has been found that spraying the cleaning solution at a temperature of approximately 160° F. and a pressure of 300 p.s.i., plus or minus 50 p.s.i., will best remove caked-on grime without wasting utilities by overheating the solution or spraying at an unnecessarily high pressure. Note that the temperature and pressure can obviously be varied to satisfy particular conditions. While various detergents, soaps and other conventional cleaning solutions are contemplated by applicants, it is obvious that in certain instances merely hot water or water under pressure will be sufficient to perform the cleaning function. The cleaning solution supply means would then be bypassed.

The circuit relay latch CRL3 contacts are open to automatically stop the drag line motor, thus temporarily halting the movement of the trailer while the boom 54 is lowered and raised in a vertical path in front of it. Initiation of the boom lowering is accomplished by the closing of the circuit relay latch CRL3, which actuates the elevator boom motor (ELV M). While the speed of the boom 54 can be varied, it is preferably lowered at a speed of about 60 feet per minute and continuously sprays the front of the trailer through rearwardly facing solution spray nozzle 74 with the heated cleaning solution. As the boom approaches the bottom of its vertical path it trips limit switch 3 (LS3) which latches circuit relay latch 4 (CRL4) to reverse the elevator boom motor, thus causing the boom to ascend. Limit switch 4 (LS4) is tripped on the upward path of the boom 54, which releases circuit relay latches CRL2, CRL3 and CRL4. The limit switch LS4 is opened as the boom passes by. When circuit relay latch CRL3 is opened again, the drag line motor circuit closes to initiate the drag line conveyor chain 36, thus continuing the trailer on its trip through the system. When limit switch 5 (LS5) is actuated by the trailer, circuit relay 6 (CR6) is energized, thus closing circuit relay latch 5 (CRL5) and opening solenoid valve 4 (S4) and also starting the side solution oscillating motor (OSC M1). The side solution spray manifolds are preferably oscillated about a 60° arc at 120 r.p.m., but the particular speed and arc may be varied to meet the necessary conditions. The circuit relay latch CRL5 enables the metering pump 70 and the high pressure pump 72 to continue operating. At this point, the spray operation has been transferred from the front of the trailer to the sides. The details of the side solution spray oscillating manifolds 56, 58, 60 and 62 will be set forth hereinafter. The trailer continues through the side spray until its entire length has been sprayed with the heated cleaning solution. As the trailer passes limit switch LS5, the switch returns to normal, thus opening circuit relay CR6. The circuit relay CR6 contacts open solenoid valve 3 (S3), close solenoid valve 4 (S4), and shut off the oscillating motor. Note that circuit relay latch CRL5 is still in its latched position so that the circuit relay CR6 contacts close and latch-in circuit relay latch CRL3 through circuit relay latch CRL5. The trailer is now in the position for the rear to be sprayed. Circuit relay latch CRL3 stops the drag line motor and starts the boom 54 down again. The boom travels down, spraying the rear of the trailer through forwardly facing solution spray nozzle 76. On descending, the boom 54 again contacts limit switch LS3. This reverses the elevator boom motor and the series of steps initiated when washing the front of the trailer is repeated. During the spraying of cleaning solution on the front and rear of the trailer, by means of the boom 54, the descent of the boom may be subject to interference from a foreign object, such as a refrigeration unit which will very often be found mounted on the front of large commercial vehicles of this type. Collision of the descending boom with such an obstacle could cause great damage to the obstacle or to the boom itself. Applicants, therefore, provide their boom 54 with a novel safety feature. Limit switches 8 and 9 (LS8 and LS9) are provided on either end of the elevator boom 54 and are connected by tie rods 77 (shown in FIGURES 3 and 4) which hang below the level of the boom itself. If either of the rods 77 contact an obstacle, the limit switches LS8 and LS9 are automatically closed which reverses the elevator motor and causes the boom 54 to ascend without crushing the obstacle or damaging the boom. Circuit relay latch CRL3 eventually closes the drag line motor circuit to initiate the drag line conveyor chain 36 and move the trailer forward toward the brush section 78. When the trailer contacts limit switch 10 (LS10), two pivotally operated side brushes 80 and 82 and the brush rinse solenoid valve 5 (S5) are actuated. The side brushes 80 and 82 agitate the solution on the sides of the trailer and give it a good scrubbing action. Water is fed through feed pipe 84 and solenoid valve S5 to each of the brushes to continuously clean the brushes and the shaft on which they rotate. The details of the brush construction will be further pointed out hereinafter. In order to save space, the brush section 78 may be placed close enough to the solution spray section 52 so that the front portion of the trailer is positioned within the brush section 78 while the trailer is stopped for the boom to descend and ascend to spray the rear of the trailer with cleaning solution. If this arrangement is desired, the brushes and solenoid valve S5 are de-energized during the period the trailer is stationary, and are reactivated as soon as the drag line motor is started. After the trailer passes through the brush section 78, it is moved on to the final rinse section 86, where it contacts limit switch LS6. This limit switch operates the high pressure pump 88 to withdraw water at room temperature from the cold water rinse tank 90 and feed it through the final rinse pipe 92 at a pressure of about 300 p.s.i., plus or minus 50 p.s.i., to four final rinse oscillating manifolds 94, 96, 98 and 100, and an overhead rinse manifold 102. Note that the top of the vehicle is not sprayed with cleaning solution or scrubbed, but is merely rinsed by the spray nozzles 104, located on the overhead rinse manifold 102. The spray nozzles 104 are preferably aimed at approximately a 45° angle to the oncoming vehicle, in order to best loosen and remove the dirt on its top. While it is most economical to merely rinse the trailer top, and such cleaning is adequate for most applications since this part of the trailer is not visible, a more thorough cleaning means may be provided if desired. The sides of the trailer are rinsed free of cleaning solution and dirt by the dual final oscillating rinse. The details of construction of the final rinse section 86 will be more clearly set forth hereinafter. When the trailer leaves this section it contacts limit switch 7 (LS7), which opens all of the control circuits and stops the entire operation, completing the vehicle wash cycle. In accordance with this invention, the washing system may be instantly halted by the stop switch (SW2) on the operator's panel, or the optional stop (SW) at the end of the vehicle's path of travel if this action becomes necessary for safety or convenience.

The numbered arrows leading from the various electrical devices in FIGURES 1 and 1a indicate the wires leading to the operator's panel, shown in FIGURE 1b, and the various circuits shown in FIGURE 2.

An important feature of this invention is the bypass switch (BY PASS SW), shown in FIGURES 1b and 2, which increases the flexibility of application of the apparatus. If, for example, it is desired to wash a small panel truck or other such vehicle, the operator can throw the bypass switch. This will cut the front and rear solution spray boom 54 out of the circuit completely, and thus depend entirely upon the side solution spray oscillating manifolds 56, 58, 60 and 62 to wash the vehicle. Other changes which would be obvious to the ordinary artisan can be incorporated into the applicants' device in order to modify it for washing passenger cars and such smaller vehicles.

It is apparent from the above detailed description of the overall layout of applicants' vehicle washing apparatus that there are considerably fewer moving parts than most devices used heretofore, and that the apparatus is concisely laid out to provide an economical and efficient means for washing vehicles, especially large commercial vehicles.

A more detailed description of certain of the apparatus sections will now be set forth in order to more clearly present the preferred embodiments and a number of additional novel features which the applicants have invented for overcoming various disadvantages of prior art devices.

*Solution Spray Section*

Reference is now made to FIGURES 3 to 7 for a more detailed description of the front and rear solution spray boom 54.

Limit switch LS2, seen clearly in FIGURE 4, comprises an overhead mounted switch with a depending bent rod 106 which is actuated by the front of the trailer 109, designated by the reference numeral 108. Such overhead limit switches are preferred throughout the instant vehicle washing apparatus because of their simplicity and dependability. However, other conventional actuating means as electric eyes, pressure initiated switches, and the like, could obviously be substituted for the overhead limit switch if desired for certain applications. The limit switch LS2 actuates an elevator motor 110, which drives an elevator motor 110, which drives an elevator gear box 112 through a belt 114. A sprocket 116 on the output shaft of the elevator gear box 112 is operatively engaged with the main drive shaft 118 of the elevator through the chain 120. Also fixed to the main drive shaft 118 is a sprocket 122, shown more clearly in FIGURE 6, which supplies power to the elevator drive chain 124. The elevator drive chain 124 passes over a lower sprocket 126 which is made adjustable through the screw member 128 to allow for varying the drive chain tension. Connecting the two ends of the drive chain 124 is a bracket 130 which has a plurality of rollers 132 rotatably mounted on either side thereof. The rollers 132 ride in a roller guide 134, which supports the entire mechanism and causes it to move in a confined vertical path. The bracket 130 has an angle iron 136 fixed to it, to which is attached the front and rear manifolds 138, 140, respectively, by U-shaped mounting straps 142. It is noted that similar supporting and guiding means are provided at both ends of the front and rear solution spray manifolds 138 and 140. The front solution manifold 138 is provided with a plurality of rearwardly facing solution spray nozzles 74, and the rear solution manifold 140 is provided with a plurality of forwardly facing solution spray nozzles 76. The spray nozzles 74 and 76 are preferably mounted at approximately a 45° angle to the vertical. A plurality of flexible hoses 144 connect the solution feed pipes 146 to the front and rear manifolds 138 and 140, respectively. After the front 108 of the trailer 109 (shown in phantom) is sprayed with cleaning solution, the drag line motor is actuated and the drag line conveyor chain 36 pulls the vehicle forward to contact limit switch LS5 and thus actuates the side solution spray oscillating manifolds 56, 58, 60 and 62 (which will be described in further detail hereinafter), to apply the cleaning solution to the entire sides of the trailer. When the trailer 109 passes limit switch LS5, the elevator boom descends to spray the rear 148 of the trailer 109. The bent rods 106 of the overhead limit switches depend sufficiently for a trailer which varies in height over a considerable distance to contact them and thus actuate the switches. However, as will be seen from FIGURE 4, they do not depend far enough to be actuated by the cab 150 (shown in phantom). The boom 54 travels down far enough to traverse the entire height of the front 108 and rear 148 of the trailer 109, without hitting the mechanism connecting the trailer 109 to the cab 150. In accordance with a feature of this invention, each end of the boom 54 has a double acting limit switch, such as limit switches LS8 and LS9, which are connected across the width of the washer apparatus by tie rods 77, depending below the level of the front and rear manifolds 138 and 140. If either of these tie rods 77 contacts a foreign object, such as a refrigeration unit, before the front and rear solution spray boom 54 reaches its lowest position (shown in phantom in FIGURE 4), the elevator motor will be automatically reversed and the boom 54 will return to its uppermost position.

The above detailed description sets forth the mechanism which uses separate front and rear manifolds. Applicants have also developed a single manifold boom which can be switched from front to rear. A detailed description of this embodiment will now be set forth.

Single Manifold Embodiment

Referring now to FIGURES 8 and 9, a single manifold 152 is shown which supports a plurality of solution spray nozzles 154, all pointing in the same direction at an angle of approximately 45° to the vertical. This single manifold 152 is rotatably supported in a bearing 156. Suitably fixed to the ends of the single manifold 152 is a bracket 158 having rollers 160 arranged to travel in roller guide 162 when driven by an elevator chain 163. Operation of this mechanism is the same as the elevator operation in the former embodiment. Attached to a shaft extension 164 is a link arm 166. Front cam rollers 168 and rear cam rollers 170 are rotatably mounted on the front and rear surfaces of said link arm 166, respectively. Two frontwardly facing, stationary vertical cam tracks 172 are provided, in which the rear cam rollers 170 ride while the single manifold 152 is being driven up and down by the elevator drive chain 163. The stationary cam tracks 172 extend vertically to a point just below the top of the vertical path of the single manifold 152. A rearwardly facing, swinging cam track 174 is located at the highest point of said stationary vertical cam track 172. The swinging cam track 174 has an extension arm 176 fixed thereto, which is pivotally mounted about its center point at 178. The extension arm 176 is attached at the end remote from the cam track to a reciprocable air piston 180. The swinging cam track 174 is laterally spaced from the stationary cam tracks 172 by a distance approximately equal to the total breadth of the link arm 166 and the front and rear cam rollers 168 and 170. This device operates to automatically switch the direction of the single manifold 152 by approximately 90°, so that when it has completed spraying the front 108 of the trailer 109 it can be automatically adapted for spraying the rear 148 of the trailer 109.

The operation of the mechanism is as follows: The rear cam rollers ride in the right-hand stationary vertical cam track 172, as shown in FIGURE 8, while the elevator drive chain 163 lowers and raises the single manifold 152 to spray the front of the trailer. During this movement, the front cam rollers 168 will not engage any guiding cam track and the solution spray nozzles 154 are as shown in phantom at 154a in FIGURE 8. When the rear cam rollers 170 reach the top of the right-hand stationary vertical cam track 172, the front cam rollers 168 will engage the swinging cam track 174, as shown in phantom on the right side of FIGURE 8. The solution spray nozzles 154 would then be in the position 154b. Air is then supplied to the air piston 180 to retract the piston and swing the extension arm 176 about its pivotal mounting 178 in order to rotate the swinging cam track 174, and thereby the single manifold 152, into the position shown on the left side of FIGURE 8, where the solution spray nozzles 154 are pointing in the direction 154c. When the elevator drive chain 163 is actuated to again lower the single manifold 152, the front cam rollers will ride down the swinging cam track 174 until the rear cam rollers 170 engage the left-hand stationary vertical cam track 172. The front cam rollers 168 will then again be riding free while the single manifold 152 descends with its solution spray nozzles 154 in the position shown at 154d, in order to wash the rear 148 of the trailer 109. It is to be understood that the air piston 180 could automatically be operated by means of limit switches or manually actuated by the operator.

Two embodiments of a front and rear solution spray boom have been disclosed hereinabove. Modifications of these embodiments which would be within the ability of the ordinary artisan are contemplated by the applicants. For example, the boom could be lowered and raised by hand, by means of a screw mechanism, by hydraulics, or by any other well known driving means. The front and rear solution manifolds 138 and 140 could be separately lowered and raised to perform their respective functions, and the rear solution manifold 140 could be dispensed with, allowing the side solution spray oscillating manifolds to apply cleaning solution to the rear of the vehicle. With a compound vehicle such as a trailer driven by a cab, the front solution spray manifold 138 is necessary to insure that the cleaning solution will be applied evenly and with sufficient pressure to the front 108 of the trailer 109.

A detailed description of the side solution spray oscillating manifolds 56, 58, 60 and 62 will now be set forth.

Side Solution Spray Oscillating Manifolds

Reference is now made to FIGURES 3 and 4, wherein the four side solution spray oscillating manifolds 56, 58, 60 and 62 are shown. It is to be noted at the outset that while four such manifolds are preferred, the number may be varied to suit particular applictions. Each of the manifolds is rotatably mounted in a bearing 182 at ground level and each has a plurality of vertically spaced spray nozzles 184. The spray nozzles 184 may begin above ground level at a point sufficient to avoid wasting cleaning solution on the wheels of the vehicle if separate wheel washing equipment is included in the apparatus. In accordance with this invention, a motor 186 drives a gear box 188 through a belt 190. An output shaft 192 on the oscillating gear box 188, through a conventional bell crank or other similar connection, provides a horizontal reciprocating motion to a linking arm 194 fixed to the end of the shaft. Preferably, the linking arm 194 is suitably connected at its other end to a coupling unit 196. The unit 196 is attached through a plurality of tie rods 198 and link arms 199 to brackets 200, and the tie rods 198 are connected to each other through hinge connections 201. Thus, as the linking arm 194 is reciprocated back and forth, the side solution spray oscillating manifolds 56 and 58 are swung back and forth to spray the cleaning solution on the side of the trailer in a uniform manner, and, at the same time, provide agitation from the force of the moving spray which will help to loosen the caked dirt and grime. Through cross tie rods 202 and link arms 199, the oscillating motion of side solution spray manifold 58 is transferred to side solution spray manifold 60. Tie rods 198 and the brackets 200, connecting side solution spray manifolds 60 and 62, cause the four manifolds to oscillate simultaneously so that both sides of the truck are provided with a coating of cleaning solution. In accordance with this invention, the cleaning solution is fed to the oscillating manifolds when the solenoid valve 4 (S4) is open, and passes through the main feed line 204 and flexible hoses 206 to the individual manifolds. A suitable curtain 208 is provided behind all of the solution spray equipment to shield other apparatus from the spray solution. The curtain 208 is preferably made of synthetic material such as nylon which will not deteriorate under the action of the cleaning solution and which is easily cleaned.

A detailed description of the brush section 78 will now be set forth.

Brush Section

Reference is made to FIGURES 10 through 14, which show the pivotal mounting of the rotating side brushes 80 and 82. Each brush is pivotally supported on a plurality of standards 210 by pivot pins 212 set in brackets 214. Upper and lower supporting arms 216 and 218 extend outwardly from the pivot pins 212 and support the brushes 220 and 222 at their remote ends. Suitable brush shafts 224 extend through the center of the brushes 220 and 222 and are rotatably supported by upper and lower bearings 226. Brush motors 228 are operatively connected to the upper ends of the brush shafts 224 by a driving belt 230. The brush motors are driven in opposite directions so that the right-hand brush 220 in FIGURE 10 rotates about its axis in a counter-clockwise direction while the left-hand brush 222 rotates about its axis in a clockwise direction. Thus, it can be seen that the two brushes scrub the sides of the trailer in an opposite direction to the trailer's path of travel. This increases the agitation and facilitates loosening the dirt for later removal. A mounting plate 232 on the standards 210 supports an air piston 234. A piston link 236 is operatively connected to the air piston 234 at one end and to a connecting shaft 238 at the other end. Also fixed to the connecting shaft 238 is a pull link 240. Swivel connections 242 and 244 operatively attach an adjustable link 246 to a bracket 248, extending between upper and lower supporting arms 216 and 218. Preferably, the link 246 is adjustable so that the extent which the brushes may be pivoted can be varied in case an especially large or especially small vehicle is to be scrubbed. By reciprocating the air piston 234, either automatically or by hand, the entire brush mechanism can be pivoted towards or away from the path of vehicle travel. The brushes 220 and 222 are provided with an arcuate shield 250 circumscribing the sides of the brush remote from the sides of the trailer, and connecting the upper and lower supporting arms 216 and 218. A reinforcing brace 252 stiffens the shield. While only two brushes are shown, it is obvious that more brushes could be added if desired, and that brushes could be provided for scrubbing other portions of the vehicle if necessary.

Another feature of the instant invention is that water is sprayed directly on the brush shafts 224 from above by means of a spray nozzle 254. The wet brushes assist in the cleaning of the trailer sides, and the water sprayed on the brush shafts 224 continuously cleans the shafts and avoids corrosion caused by the cleaning solution.

The pneumatic circuit for operating the brushes is clearly seen in FIGURE 14. Fluid passes through a gate valve 256 and a filter lubricator and pressure gage represented by reference numerals 258 and 260. A four-way solenoid valve 262 and check valves 264 determine the direction of fluid flow in the air pistons 234. A silencer is preferably included in the circuit and is designated by reference numeral 266.

The details of the final rinse section 86 will now be set forth.

Final Rinse Section

Reference is now made to FIGURES 15 to 18, wherein the oscillating manifolds 94, 96, 98 and 100, and the overhead rinse manifold 102 are shown. Cold water enters through main feed pipe 268 and passes through flexible hoses 270 to the individual oscillating manifolds and the overhead rinse manifold 102. Ooscillation of the manifolds is accomplished in a manner similar to the oscillation of the side solution spray manifolds; that is, a motor 272 drives a gear box 274 through a belt 276. The output shaft of the gear belt 278 is connected through a linking arm 280 to a coupling means 282. Tie rods 284 and link arms 285 cause oscillation of manifolds 94 and 96 around the brackets 286 and cross tie rods 288 convey the oscillating motions to the opposite manifolds 98 and 100. Hinge connections 289 connect the tie rods. Through this arrangement, the four final rinse manifolds oscillate simultaneously to spray the trailer and remove the loosened dirt and excess cleaning solution. The spray nozzles 290 on oscillating manifolds 96 and 100, that is, the last two manifolds along the path of travel of the trailer, preferably oscillate about a center point which directs them slightly toward the oncoming vehicle. This insures that the final rinsing action will wash the trailer toward the rear to remove any remaining debris. A boom arrangment similar to the one used in applying cleaning solution may be included in the final rinse section to rinse the front and rear of the vehicle, but this is not found necessary for most applications since the oscillating manifolds will adequately spray rinse water on these portions of the vehicle. Another curtain, designated by numeral 292, is provided behind the final rinse manifolds for the same purpose as the nylon curtain 208.

The foregoing specification is intended to be illustrative of preferred embodiments of this invention. It is to be understood that the structural details of this disclosure may be varied by those skilled in the art without departing from the spirit or scope of this invention.

Whatt is hereby claimed and desired to be secured by Letters Patent is:

1. A washing apparatus for cleaning a vehicle having a front, a rear, two sides and a top, comprising means for conveying said vehicle along a predetermined path of travel, means for pre-rinsing said vehicle with water, a front solution manifold, at least one oscillatable side solution manifold on each side of the path of travel of said vehicle, means for oscillating said side solution manifold about a vertical axis, a rear solution manifold, means for supplying cleaning solution to each of said front, side and rear solution manifolds, means on each of said front, side and rear solution manifolds for applying said cleaning solution to the front, sides and rear of said vehicle, and means for rinsing said cleaning solution from said vehicle.

2. A washing apparatus in accordance with claim 1, further comprising at least one rotatably mounted, pivotally supported brush on each side of the path of travel of said vehicle between said rear solution manifold and said means for rinsing said cleaning solution from said vehicle, means for rotating said brushes about a vertical axis, and means for pivoting said brushes into operative engagement with the sides of said vehicle.

3. A washing apparatus in accordance with claim 2, wherein each brush is rotated in a direction opposite to the path of travel of said vehicle.

4. A washing apparatus in accordance with claim 1, wherein said means for conveying said vehicle along a predetermined path of travel comprises a drag line conveyor chain located beneath said vehicle, a means for attaching said vehicle to said chain, and a means for driving said chain.

5. A washing apparatus in accordance with claim 1, wherein said front and rear solution manifolds extend transversely across the path of travel of said vehicle, further comprising means for normally maintaining said front and rear solution manifolds in a position above said vehicle, and means for lowering and raising said front and rear solution manifolds in vertical path over substantially the total height of the front and rear of said vehicle.

6. A washing apparatus in accordance with claim 1, wherein said front and rear solution manifolds extend transversely across the path of travel of said vehicle, further comprising means for normally maintaining said front and rear solution manifolds in a position above said vehicle, means to automatically interrupt the travel of said vehicle immediately before reaching said front solution manifold, means to lower and raise said front solution manifold in a vertical path over substantially the total height of the front of said vehicle, a plurality of spray nozzles on said front solution manifold directed towards the front of said vehicle for applying said cleaning solution thereto, and means to automatically continue the travel of said vehicle when said front solution manifold has returned to a position above said vehicle.

7. A washing apparatus in accordance with claim 6, further comprising means to automatically interrupt the travel of said vehicle immediately after passing said rear solution manifold, means to lower and raise said rear solution manifold in a vertical path over substantially the total height of the rear of said vehicle, a plurality of spray nozzles on said rear solution manifold directed towards the rear of said vehicle for applying said cleaning solution thereto, and means to automatically continue the travel of said vehicle when said rear solution manifold has returned to a position above said vehicle.

8. A washing apparatus in accordance with claim 7, further comprising means to automatically start the flow of said cleaning solution to said front and rear solution manifolds, respectively, when each manifold begins to move downward, and means to automatically stop the flow of said cleaning solution to said front and rear solution manifolds, respectively, when each manifold returns to a position above said vehicle.

9. A washing apparatus in accordance with claim 7, further comprising means to selectively bypass said front and rear solution manifolds and maintain the same in their normal position above said vehicle.

10. A washing apparatus in accordance with claim 1, wherein said front and rear solution manifolds consist of a rotatably supported single solution manifold extending transversely across the path of travel of said vehicle, said single solution manifold having a plurality of spray nozzles directed downwardly and toward the front of said vehicle at approximately a 45° angle as said vehicle approaches said manifold, means for normally maintaining said single solution manifold above said vehicle, means to automatically interrupt the travel of said vehicle immediately before reaching said single solution manifold, means to lower and raise said single solution manifold in a vertical path over substantially the total height of the front of said vehicle while said plurality of spray nozzles are directed towards the front of said vehicle, and means to rotate said single solution manifold approximately 90° to direct said plurality of spray nozzles downwardly and towards the rear of said vehicle at approximately a 45° angle before said vehicle has passed said single solution manifold.

11. A washing apparatus in accordance with claim 10, further comprising means to automatically continue the travel of said vehicle when said single solution manifold has returned to a position above said vehicle, means to actuate said 90° rotation of said single solution manifold, means to again automatically interrupt the travel of said vehicle immediately after passing said single solution manifold, means to lower and raise said single solution manifold in a vertical path over substantially the total height of the rear of said vehicle, and means to again automatically continue the travel of said vehicle when said single solution manifold has returned to a position above said vehicle.

12. A washing apparatus in accordance with claim 11, further comprising means to automatically start the flow of said cleaning solution to said single solution manifold when said single solution manifold begins to move downward and means to automatically stop the flow of said cleaning solution to said single solution manifold when said single solution manifold returns to a position above said vehicle.

13. A washing apparatus in accordance with claim 11, further comprising means to selectively bypass said single solution manifold and maintain the same in its normal position above said vehicle.

14. A washing apparatus in accordance with claim 1, wherein said means for supplying cleaning solution consists of a water storage tank, an inlet pipe having two ends, one end of said inlet pipe connected to said water storage tank and the other end of said inlet pipe connected to a source of supply of water, a heater operatively connected to said water storage tank, a high pressure pump adapted to withdraw hot water from said water storage tank and feed the same under pressure to a feed pipe, said feed pipe having branches leading to each of said front, side and rear solution manifolds, a concentrated cleaning solution storage tank, a metering pump adapted to withdraw concentrated cleaning solution from said storage tank and feed the same to said feed pipe at a point preceding the branching of said feed pipe, and a control valve on said metering pump to vary the concentration of the cleaning solution delivered to said front, side and rear solution manifolds.

15. A washing apparatus in accordance with claim 1, wherein said means for rinsing said cleaning solution from said vehicle consists of an overhead rinse manifold, at least one oscillatable final rinse manifold on each side of the path of travel of said vehicle, means for oscillating said final rinse manifolds about a vertical axis, means for supplying rinse water under pressure to said overhead rinse and final rinse manifolds, and a plurality of spray nozzles on said overhead and final rinse manifolds for applying said rinse water to said vehicle.

16. A washing apparatus in accordance with claim 15, wherein the spray nozzles on said overhead rinse manifold are directed downwardly at approximately a 45° angle towards the approaching vehicle.

17. A washing apparatus in accordance with claim 15, having two oscillatable final rinse manifolds spaced along the path of travel of said vehicle on each side thereof, wherein the last-encountered final rinse manifolds oscillate about a center point which directs the spray nozzles thereon toward said approaching vehicle.

18. In a washing apparatus for cleaning a vehicle having a body portion with a front and a rear, and wherein said vehicle is conveyed along a predetermined path of travel, the improvement which comprises a spray boom having two ends, said spray boom extending transversely across the path of travel of said vehicle, means for normally maintaining said spray boom above said vehicle, means for lowering and raising said spray boom in a verical path over substantially the total height of the body portion of said vehicle, first in front of, and then to the rear of, said vehicle, means for supplying a fluid material to said spray boom and means on said spray boom for applying said fluid material first to the front, and then to the rear, of said body portion as said spray boom is lowered and raised said washing apparatus further comprising means to automatically interrupt the travel of said vehicle immediately before reacting said boom, means to automatically continue the travel of said vehicle when said boom has returned to a position above said vehicle, means to again automatically interrupt the travel of said vehicle immediately after passing said boom and means to again automatically continue the travel of said vehicle when said boom has again returned to a position above said vehicle.

19. A washing apparatus in accordance with claim 18, further comprising means on said spray boom for automatically raising said spray boom if said spray boom contacts a foreign object before reaching the bottom of said vertical path.

20. A washing apparatus in accordance with claim 19, wherein said means for automatically raising said spray boom comprises limit switches on each end of said spray boom and at least one horizontally extending tie rod connecting said limit switches.

21. A washing apparatus in accordance with claim 18, wherein said means for applying said fluid material first to the front and then to the rear of said body portion comprises front and rear manifolds mounted on said boom, a plurality of spray nozzles on said front manifold directed towards the front of said body portion as said vehicle approaches said boom, a plurality of spray nozzles on said rear manifold directed towards the rear of said body portion after said vehicle has passed said boom, and means for selectively supplying said fluid material to either of said manifolds.

22. A washing apparatus in accordance with claim 21, wherein all of said spray nozzles are directed downwardly at approximately a 45° angle.

23. A washing apparatus in accordance with claim 21, wherein said means for lowering and raising said spray boom comprises a bracket attached to each end of said spray boom, a plurality of vertically spaced rollers rotatably supported on each of said brackets, a vertically extending roller guide on each side of said boom, said rollers being confined to move in said guides, a chain fixed to each of said brackets, said chains passing over sprockets at the top and bottom of said vertical path and means to drive one of said chains first downwardly and then upwardly.

24. A washing apparatus in accordance with claim 18, wherein said means for applying said fluid material first to the front and then to the rear of said body portion comprises a single manifold rotatably mounted on said spray boom, said single manifold having a plurality of spray nozzles directed downwardly and toward the front of said body portion at approximately a 45° angle as said vehicle approaches said spray boom, and means to rotate said single manifold approximately 90° to direct said plurality of spray nozzles downwardly and towards the rear of said body portion at approximately a 45° angle before said vehicle has passed said boom.

25. A washing apparatus in accordance with claim 24 wherein said means for lowering and raising said spray boom comprises a bracket attached to each end of said spray boom, a plurality of vertically spaced rollers rotatably supported on each of each brackets, a vertically extending roller guide on each side of said boom, said rollers being confined to move in said guides, a chain fixed to each of said brackets, said chains passing over sprockets at the top and bottom of said vertical path and means to drive one of said chains first downwardly and then upwardly.

26. A washing apparatus in accordance with claim 25, wherein said means to rotate said single manifold comprises a link arm having a front and a rear surface and two ends, one end of said link arm being fixed to one end of said single manifold, front and rear cam rollers rotatably mounted on the front and rear surfaces, respectively, of the other end of said link arm, two vertically extending, frontwardly facing, spaced stationary cam tracks, the top of said stationary cam track being slightly below the top of said vertical path, said rear cam rollers being confined to move in one of said stationary cam tracks during a substantial portion of the lowering and raising of said spray boom, a rearwardly facing swinging cam track having a bottom and a top end, said swinging cam track being pivotally mounted above said vertical path, the bottom end of said swinging cam track extending slightly below the top of said stationary cam tracks, said front cam rollers being confined to move in said swinging cam track when said spray boom is raised above the top of said stationary cam tracks and means to pivot said swinging cam track from a position where its bottom end is in juxtaposition with one of said stationary cam tracks to a position where its bottom end is in juxtaposition with the other of said stationary cam tracks.

27. A washing apparatus in accordance with claim 26, wherein said means to pivot said swinging cam track comprises an extension arm having two ends, said pivotal mounting being approximately midway between said two ends, one end of said extension arm being fixed to the top end of said swinging cam track, a reciprocable piston operatively connected to the other end of said extension arm, and means to reciprocate said piston.

28. In a washing apparatus for cleaning a vehicle having a body portion with sides, wherein said vehicle is conveyed along a predetermined path of travel, the improvement which comprises at least one oscillatable spray manifold on each side of the path of travel of said vehicle, means for oscillating said spray manifolds about a vertical axis, said means for oscillating said spray manifolds being adapted to oscillate each spray manifold about an approximately 60° arc, means for supplying a fluid material to each of said spray manifolds, and a plurality of vertically spaced spray nozzles on each of said spray manifolds for applying said fluid material to the sides of the body portion of said vehicle.

29. A washing apparatus in accordance with claim 28, wherein said means for oscillating said spray manifolds comprises a bracket attached to each of said spray manifolds, a plurality of link arms each having two ends, one of said ends of each link arm being fixed to one of said brackets, a plurality of tie rods hingedly connecting the other ends of two link arms fixed to different spray manifolds, a reciprocable piston fixed to the hinged connection between one of said link arms and one of said tie rods, and means to reciprocate said piston.

References Cited in the file of this patent

UNITED STATES PATENTS

| | | |
|---|---|---|
| 1,823,222 | Whitsitt | Sept. 15, 1931 |
| 1,866,197 | Cunningham | July 5, 1932 |
| 3,037,223 | Lovsey | June 5, 1962 |
| 3,060,473 | Vani | Oct. 30, 1962 |

FOREIGN PATENTS

| | | |
|---|---|---|
| 437,672 | Germany | Nov. 25, 1926 |